(12) United States Patent
Jones (10) Patent No.: US 12,336,457 B2
(45) Date of Patent: Jun. 24, 2025

(54) AUXILIARY PRESSURE CIRCUIT FOR A ROUND BALER

(71) Applicant: Deere & Company, Moline, IL (US)

(72) Inventor: Austin J. Jones, Ottumwa, IA (US)

(73) Assignee: Deere & Company, Moline, IL (US)

( * ) Notice: Subject to any disclaimer, the term of this patent is extended or adjusted under 35 U.S.C. 154(b) by 605 days.

(21) Appl. No.: 17/847,322

(22) Filed: Jun. 23, 2022

(65) Prior Publication Data

US 2023/0413731 A1 Dec. 28, 2023

(51) Int. Cl.
*A01F 15/08* (2006.01)
*A01F 15/07* (2006.01)

(52) U.S. Cl.
CPC ...... *A01F 15/0833* (2013.01); *A01F 15/0715* (2013.01); *A01F 2015/078* (2013.01); *A01F 2015/0795* (2013.01)

(58) Field of Classification Search
CPC .............. A01F 15/0833; A01F 15/0715; A01F 2015/078; A01F 2015/0795
See application file for complete search history.

(56) References Cited

U.S. PATENT DOCUMENTS

| | | | |
|---|---|---|---|
| 4,545,298 A | 10/1985 | Viaud | |
| 4,565,123 A * | 1/1986 | Sanders | B30B 9/3025 100/50 |
| 4,759,278 A | 7/1988 | Jean | |
| 5,165,332 A * | 11/1992 | Lee | A01F 15/0833 100/88 |
| 5,622,104 A | 4/1997 | Viesselmann et al. | |
| 2012/0055354 A1* | 3/2012 | Humbert | A01F 15/0833 251/129.01 |
| 2013/0000497 A1* | 1/2013 | Posselius | A01F 15/0825 100/40 |
| 2017/0188520 A1* | 7/2017 | Simmons | A01F 15/0833 |
| 2019/0045717 A1* | 2/2019 | Talsma | A01F 15/0715 |
| 2019/0224934 A1* | 7/2019 | Ostermann | A01F 15/07 |
| 2020/0214219 A1 | 7/2020 | Lebeau et al. | |
| 2021/0329843 A1 | 10/2021 | Kraus et al. | |

(Continued)

FOREIGN PATENT DOCUMENTS

| | | |
|---|---|---|
| EP | 1008292 A1 | 6/2000 |
| GB | 1582675 A | 1/1981 |
| KR | 101954598 B1 | 3/2019 |

OTHER PUBLICATIONS

Levinsen, Anders; Hydraulic pressure intensifiers; 9 page print out from https://www.fluidpowerworld.com/can-hydraulic-pressure-intensifiers-improve-system-design/ (Jun. 21, 2022).

(Continued)

*Primary Examiner* — Joseph M Rocca
*Assistant Examiner* — Julia C Tran
(74) *Attorney, Agent, or Firm* — Lucian Wayne Beavers; Patterson Intellectual Property Law PC (57) ABSTRACT

An auxiliary pressure source is provided in the baler hydraulic system of a round baler. During a round bale formation operation and/or during a bale wrapping or tying operation hydraulic pressure provided to the tensioning cylinders of the baler may be periodically boosted above that normally permitted by the high pressure relief valve of the baler hydraulic system.

17 Claims, 5 Drawing Sheets

(56) References Cited

U.S. PATENT DOCUMENTS

2022/0015300 A1    1/2022  Derscheid et al.

OTHER PUBLICATIONS

HC1—miniBOOSTER Hydraulics A/S; 6 page print out from https://www.minibooster.com/hc1/ (Jun. 21, 2022).
Extended European Search Report and Written Opinion issued in European Patent Application No. 23179031.2, dated Nov. 9, 2023, in 08 pages.

* cited by examiner

FIG. 5

AUXILIARY PRESSURE CIRCUIT FOR A ROUND BALER

FIELD OF THE DISCLOSURE

The present disclosure relates to a round baler construction for improving the compaction density of a round bale during bale formation and/or during a bale wrapping or bale tying operation.

BACKGROUND

Round bale density is perhaps the most important aspect of the formation of round bales of hay or other forage material. The bales require density in order to maximize weight to size ratio as well as to minimize air within the bale for different types of crops and feed processes.

Also tightly wrapped round bales provide an improved bale appearance and tend to store better as square shouldered bales tend to stack and line up more neatly with less exposed surface thus leading to less spoilage.

Accordingly, there is a need for improved apparatus and methods for increasing the density of round bales during bale formation and during the bale wrapping and/or tying operations.

SUMMARY OF THE DISCLOSURE

In one embodiment a method of operating a round baler is provided. The round baler may include at least one tension belt, at least one tension cylinder for maintaining tension on the tension belt as a round bale is formed in a bale chamber, and a baler hydraulic system communicated with the tension cylinder. The method may include the steps of:
  (a) communicating the baler hydraulic system with a primary pressure source including a pump and a fluid reservoir;
  (b) isolating the tension cylinder from the primary pressure source and thereby trapping an initial pressure in the tension cylinder;
  (c) as the round bale forms in the bale chamber during a bale forming operation, limiting pressure increase in the tension cylinder to a limit pressure with a pressure relief valve;
  (d) temporarily blocking operation of the pressure relief valve; and
  (e) during step (d), temporarily communicating the tension cylinder with an auxiliary pressure source to increase hydraulic pressure in the tension cylinder to an increased pressure greater than the limit pressure.

In another embodiment a round baler for forming a round bale of hay may include a bale chamber, a tension belt and a tension cylinder configured to place tension on the tension belt as the round bale is formed in the bale chamber. The baler may include a baler hydraulic system including a pressure line and a tank line, the pressure line being configured for connection to a hydraulic fluid supply line of a primary pressure source, the tank line being configured for connection to a hydraulic fluid return line of the primary pressure source. A valve block may be disposed in the baler hydraulic system and configured to control communication between the tension cylinder and the primary pressure source. A first pressure relief valve may be disposed in the baler hydraulic system and configured to limit pressure in the tension cylinder to a first limit pressure as the round bale is formed in the bale chamber. A first blocking valve may be configured to temporarily block operation of the first pressure relief valve. An auxiliary pressure source may be configured to temporarily increase hydraulic pressure in the tension cylinder to an increased pressure greater than the first limit pressure.

Numerous objects, features and advantages of the present invention will be readily apparent to those skilled in the art upon a review of following description in conjunction with the accompanying drawings.

DETAILED DESCRIPTION

Figure 1:
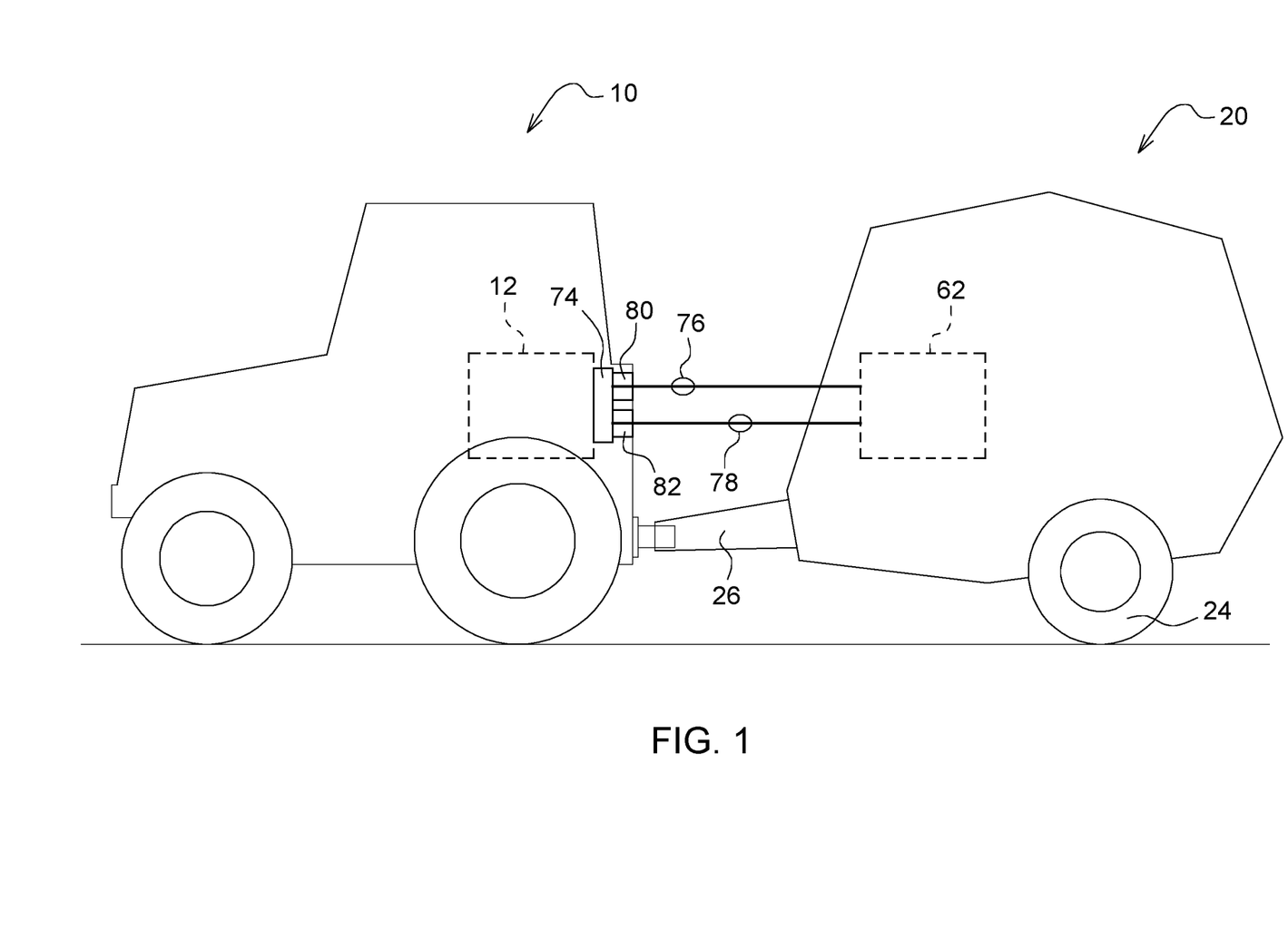
FIG. 1 is a schematic view of a round baler being pulled by a tractor in accordance with the present disclosure.

FIG. 1 schematically shows a round baler 20 being pulled by a tractor The tractor includes a tractor hydraulic system schematically indicated at 12. The tractor hydraulic system 12 may alternatively be referred to as a primary pressure source 12.

Figure 2:
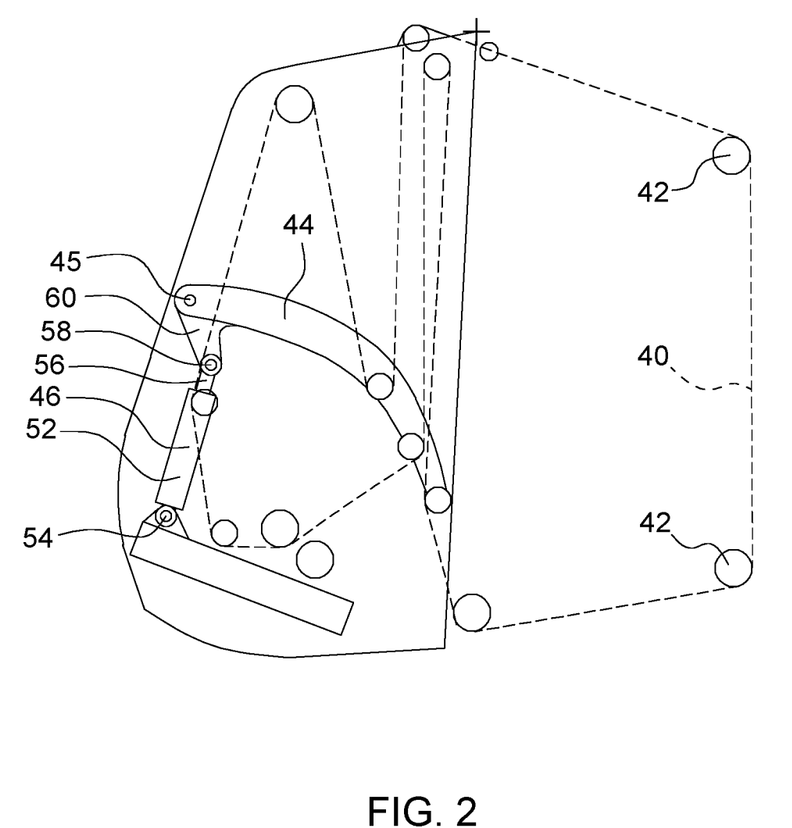
FIG. 2 is a schematic side elevation view of the mechanical components of the round baler of FIG. 1 before formation of a round bale.
Figure 3:
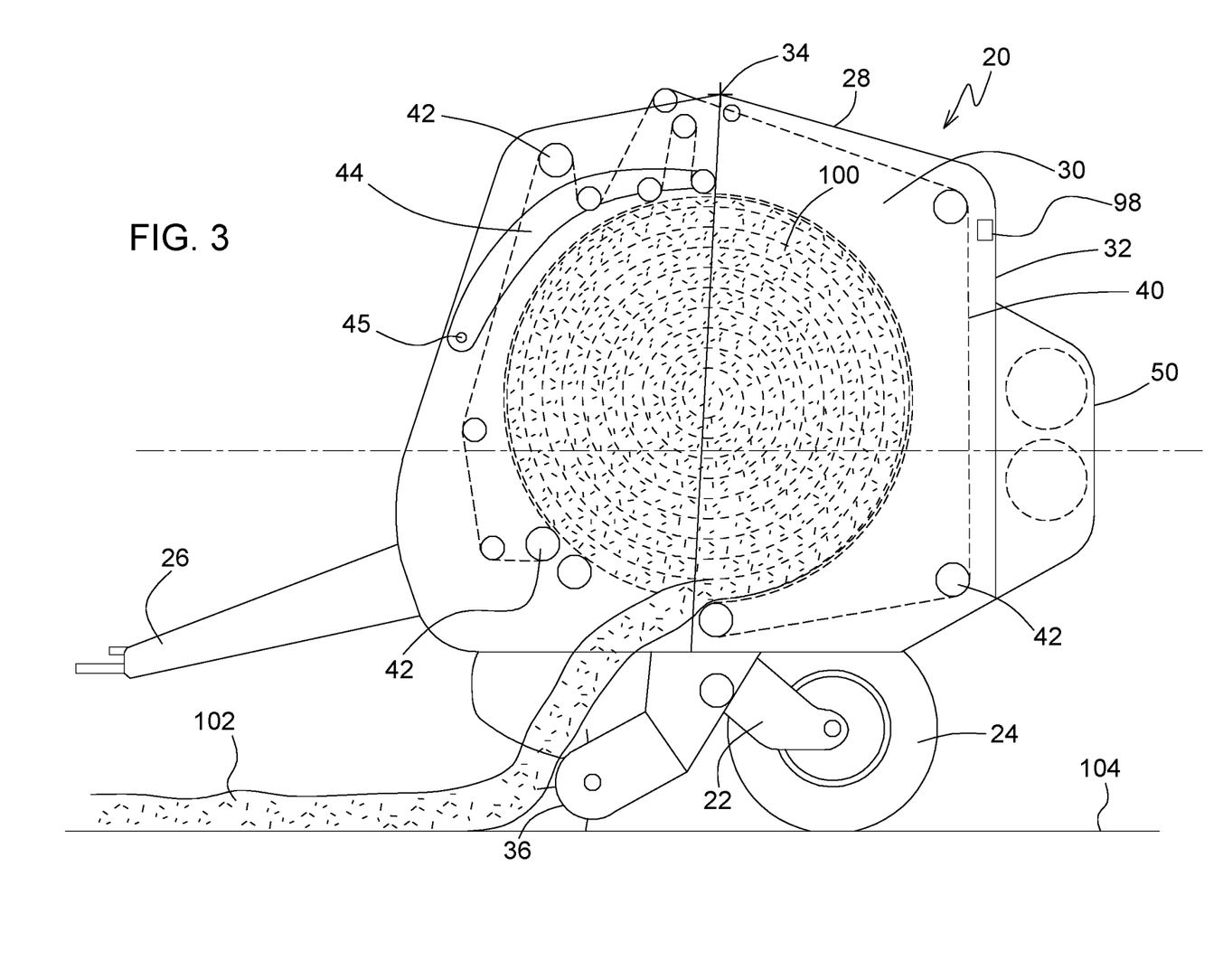
FIG. 3 is a schematic side elevation view of the round baler of FIG. 2 during the formation of the round bale.

The mechanical details of the round baler 20 are seen in FIGS. 2 and 3. The round baler 20 includes a frame 22. One or more ground engaging elements 24, such as but not limited to one or more wheels and/or tracks, are attached to and rotatably supported by the frame 22. A tongue 26 may be coupled to the frame 22 at a forward end of the frame 22. A hitch arrangement may be included with the tongue 26. The hitch arrangement may be used to attach the round baler 20 to a traction unit, such as but not limited to the agricultural tractor 10. In other implementations, the round baler 20 may be self-propelled, in which case the traction unit and the round baler 20 are configured as a single, self-propelled vehicle.

The round baler 20 includes a housing or body 28 forming a baling chamber 30. The body 28 is attached to and supported by the frame 22. The body 28 may include one or more walls or panels that at least partially enclose and/or define the baling chamber 30. The round baler 20 further includes a rear gate 32. The rear gate 32 is attached to and rotatably supported by the body 28. The rear gate 32 is positioned adjacent a rearward end of the frame 22 and is pivotably moveable about a gate axis 34. The gate axis 34 is generally horizontal and perpendicular to a central longitudinal axis of the frame 22. The rear gate 32 is moveable between a closed position for forming a bale 100 within the baling chamber 30, and an open position for discharging the bale 100 from the baling chamber 30. The rear gate 32 is further moveable to at least one intermediate position disposed between the open position and the closed position.

The round baler 20 includes a pick-up 36 disposed proximate the forward end of the frame 22. The pickup gathers crop material 102 from a ground surface 104 and directs the gathered crop material toward and into an inlet of the baling chamber 30. The pickup may include, but is not limited to tines, forks, augers, conveyors, baffles, etc., for gathering and moving the crop material. The round baler 20 may be equipped with a pre-cutter (not shown), disposed between the pickup and the inlet. As such, the pre-cutter is disposed downstream of the pickup and upstream of the inlet relative to a direction of travel of the crop material. The pre-cutter cuts or chops the crop material into smaller pieces.

The round baler 20 shown in the Figures and described herein is depicted and described as a variable chamber baler. As is understood by those skilled in the art, the variable chamber baler includes a plurality of longitudinally extending side-by-side forming belts 40 that are supported by a plurality of rollers 42. The bale 100 is formed by the forming belts 40 and one or more side walls of the housing. The forming belts 40 may also be referred to as tension belts 40.

The crop material 102 is directed through the inlet and into the baling chamber 30, whereby the tension belts 40 roll the crop material in a spiral fashion into the bale 100 having a cylindrical shape. The tension belts 40 apply a constant pressure to the crop material as the crop material is formed into the bale 100. A belt tensioning arm 44 pivots around a mounted axis 45 within the front frame of the baler 20 and continuously moves with the tension belts 40 radially outward relative to a center of the cylindrical bale 100 as the diameter of the bale 100 increases. There may be more than one belt tensioning arm 44. The belt tensioning arm 44 is connected to a first tension cylinder 46 and a second tension cylinder 48, both shown in FIG. 4.

FIG. 2 shows the mechanical connection of the first tension cylinder 46 to the belt tensioning arm 44. The first tension cylinder 46 includes a cylinder 52 pivotally connected at 54 to the frame 22 and a rod 56 pivotally connected at 58 to an extension 60 of the belt tensioning arm 44. As the bale 100 grows within the baling chamber 30, the rod ends of the tension cylinders 46, 48 are pulled outward thus increasing hydraulic pressure in the rod ends. Conversely, when hydraulic pressure is applied to the rod ends of the tension cylinders 46, 48 the belt tensioning arm 44 is pulled downward which increases tension on the tension belts 40.

Depending upon the design of the round baler in some embodiments a lowering motion of the belt tensioning arm 44 may engage the belt tensioning arm 44 itself with the periphery of the round bale to squeeze the bale and provide increased bale compaction regardless of the tension state of the tension belts 40.

The round baler 20 includes a wrapping and/or tying system 50. The wrapping and/or tying system 50 is operable to wrap the bale 100 with a wrap material inside the baling chamber 30. Once the bale 100 is formed to a desired size, the wrap system 50 feeds the wrap material into the baling chamber 30 to wrap the bale 100 and thereby secure the crop material in a tight package and maintain the desired shape of the bale 100. The wrap material may include, but is not limited to, a twine, a net mesh, or a solid plastic wrap. In some embodiments movement of the gate into the open position simultaneously moves the tension belts 40 clear of the formed bale 100, and allows the formed and wrapped bale 100 to be discharged through the rear of the baling chamber 30.

Figure 4:
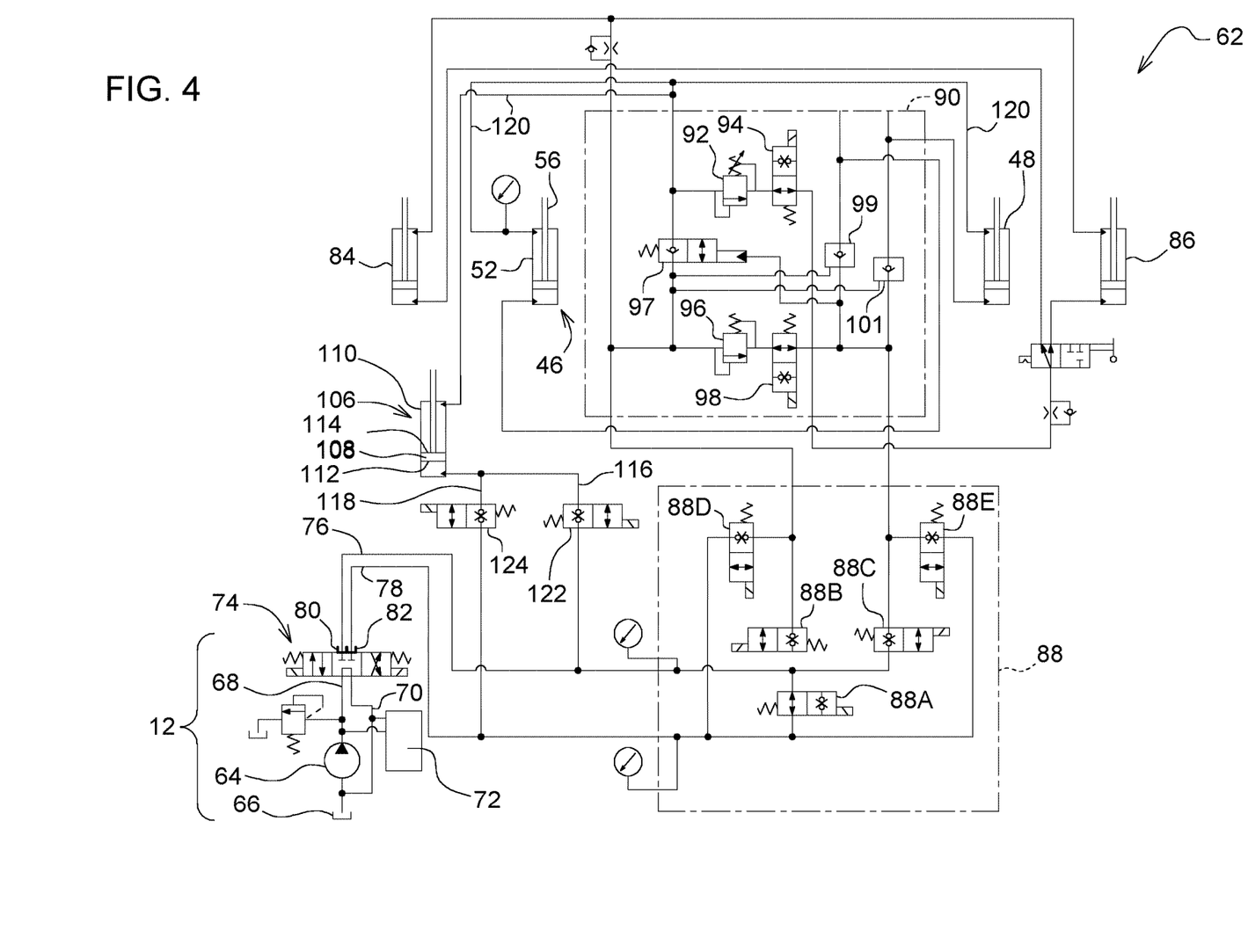
FIG. 4 is a schematic diagram of the baler hydraulic system of the round baler.

The round baler 20 includes a baler hydraulic system 62 schematically indicated in FIG. 1 and the details of which are schematically shown in FIG. 4. Also shown in FIG. 4 are further details of the tractor hydraulic system 12, which as noted may also be referred to as a primary pressure source 12. The tractor hydraulic system 12 may include a pump 64 and a tank or fluid reservoir 66. The pump 64 draws hydraulic fluid from tank 66 and provides pressurized hydraulic fluid to a hydraulic fluid supply line 68 of the tractor hydraulic system 12. A hydraulic fluid return line 70 of the tractor hydraulic system 12 returns hydraulic fluid to the tank 66. Various hydraulically powered components of the tractor 10 are schematically indicated at 72 and are connected to the hydraulic fluid supply line 68 and the hydraulic fluid return line 70. A tractor selective control valve (TSCV) 74 may be mounted on the tractor 10 as schematically indicated in FIG. 1 to provide a convenient means for connecting the tractor hydraulic system 12 to various implements pulled by the tractor 10, such as the round baler 20.

If the baler 20 is constructed as a self-propelled baler, instead of being towed by the tractor 10, the various components shown for the primary pressure source 12 in FIG. 4 may be located on the baler 20 rather than on the tractor 10.

The baler hydraulic system 62 includes a pressure line 76 and a tank line 78. The pressure line 76 includes a pressure line connection 80, which may be in the form of a quick connect coupling 80, for connecting the pressure line 76 to the hydraulic fluid supply line 68 of the tractor hydraulic system 12 via the TSCV 74. The tank line 78 includes a tank line connection 82, which may be in the form of a second quick connect coupling 82, for connecting the tank line 78 to the hydraulic fluid return line 70 of the tractor hydraulic system 12 via the TSCV 74. It will be appreciated that depending upon the position of the TSCV valve 74 the connections of the lines 76 and 78 with the lines 68 and 70 may be reversed. In some embodiments, the tractor 10 may have what is called power beyond where the TSCV is bypassed, and flow is provided to the implement, such as baler 20, allowing the implement to control the flow using load sensing and other hydraulic valving known to those skilled in the art. This provides the same general hydraulic fluid power to the implement system from the primary pressure source.

The hydraulic actuators shown in FIG. 4 include the first and second tension cylinders 46 and 48, previously described, and first and second gate cylinders 84 and 86. The primary flow of hydraulic fluid from the tractor hydraulic system 12, or other primary pressure source 12, to and from the baler hydraulic system 62 is controlled by first valve block 88, sometimes referred to as an automatic gate valve block 88. Within the valve block 88 there may be an arrangement of five solenoid operated check valves 88A, 88B, 88C, 88D and 88E which can be opened and closed in various combinations to circulate hydraulic fluid in either chosen direction through the baler hydraulic system 12. The first valve block 88 may be generally described as a valve block 88 disposed in the baler hydraulic system 62 and configured to control communication between the tension cylinders 46, 48 and the pressure line connection 80 and the tank line connection 82.

It is noted that the term "valve block" as used herein does not imply any specific structure to the arrangement of valves described as being included in the "valve block." A "valve block" may simply be an arrangement of valves interconnected by fluid connections of any form.

The baler hydraulic system 62 also includes a main baler valve block 90. Within the main baler valve block 90 there is a high pressure relief valve 92, which may also be referred to as a first pressure relief valve 92, configured to limit pressure in the tension cylinders 46, 48 to a first limit pressure as the round bale 100 is formed in the bale chamber 30. A first blocking valve 94 may be associated with the first pressure relief valve 92 and configured to temporarily block operation of the first pressure relief valve 92.

Alternatively, instead of using a separate blocking valve 94 in combination with the pressure relief valve 92, a proportional pressure relief valve could be used which allows relief pressure to be adjusted by the operator or by the controller. The adjustment of the relief pressure of such a proportional pressure relief valve from a first limit value to a higher limit value may be described as temporarily blocking operation of the pressure relief valve at the first limit value.

Within the main baler valve block 90 there may also be a low pressure relief valve 96 and a second blocking valve 98.

Additionally, pilot operated check valves 97, 99 and 101 may be included in the main baler valve block 90 as shown in FIG. 4. It is noted that the valve symbols for valves 99 and 101 used in FIG. 4 have been abbreviated due to space limitations, but the valves 99 and 101 may be of the same construction as illustrated for valve 97, namely a pilot operated two position check valve.

When it is desired to retract the tensioning cylinders 46, 48 the check valves 99 and 101 may be opened to permit hydraulic fluid flow out of the cylinder ends of the tensioning cylinders 46, 48. When it is desired to open valves 99 and 101 the valves 88B and 88E of the first valve block 88 may also be opened.

The baler hydraulic system 62 may further include an auxiliary pressure source 106 configured to temporarily increase hydraulic pressure in the tension cylinders 46, 48 to an increased pressure greater than the limit pressure of the high pressure relief valve 92. In the illustrated embodiment the auxiliary pressure source 106 may take the form of an auxiliary hydraulic cylinder assembly 106 including a piston 108 movable in a cylinder 110. The piston 108 may have a cylinder side 112 and a rod side 114, the cylinder side 112 having a larger area than the rod side 112. It is noted that in the present disclosure the auxiliary hydraulic cylinder 106 is not shown as having any other functionality than that of serving as an auxiliary pressure source. In some embodiments, however, the auxiliary hydraulic cylinder 106 may be functionally attached to another component of the baler 20 so that the auxiliary hydraulic cylinder 106 serves a dual functionality.

A pressure tie-in line 116 may communicate the pressure line 76 with the cylinder side 112 of piston 108. A tank tie-in line 118 may communicate the tank line 78 with the cylinder side 112 of the piston 108. An auxiliary pressure line 120 may communicate the rod side 114 of piston 108 with the tension cylinders 46, 48. A first control valve 122 may control flow of hydraulic fluid through the pressure tie-in line 116. A second control valve 124 may control flow of hydraulic fluid through the tank tie-in line 118.

In other embodiments the auxiliary pressure source 106 may take other forms. For example, the auxiliary pressure source 106 may take the form of a hydraulic pressure intensifier. A pressure intensifier may be constructed by mechanically connecting two pistons, each working in a separate cylinder of a different diameter. As the pistons are mechanically linked, their force and stroke length are the same. If the diameters are different, the hydraulic pressure in each cylinder will vary in the same ratio as their areas; the smaller piston giving rise to a higher pressure.

Figure 5:
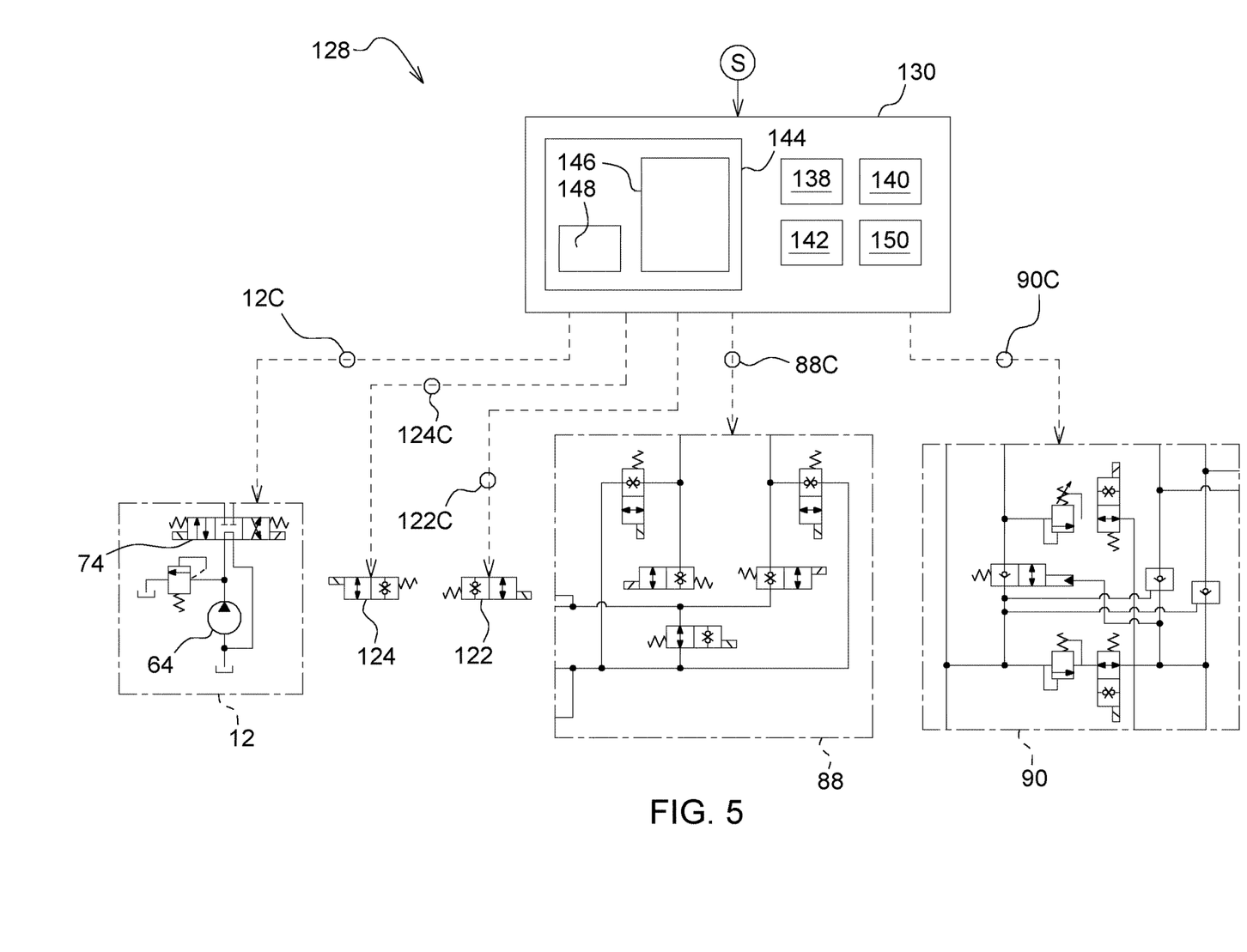
FIG. 5 is a schematic diagram of the electronic control system of the round baler.

Controller:

As schematically illustrated in FIG. 5, the round baler 20 includes a control system 128 including a controller 130. The controller 130 may be part of the machine control system of the round baler 20, or it may be a separate control module. The controller 130 may be mounted in the operator's cabin of the tractor 12 or it may be mounted on the frame 22 of the round baler 20. The controller 130 is configured to receive input signals from sensors S as well as other information regarding the operation of the round baler 20. The signals transmitted from the various sensors to the controller 130 are schematically indicated in FIG. 5 by a phantom line connecting the sensors S to the controller with an arrowhead indicating the flow of the signal from the sensors S to the controller 130.

Similarly, the controller 130 will generate control signals for controlling the operation of the various valves or actuators described herein, which control signals are indicated schematically in FIG. 5 by phantom lines connecting the controller 130 to the various control valves and pilot operated valves discussed above.

The control signal communication lines to the primary pressure source 12, including the pump 64 and TSCV 74, are designated collectively as 12C. The control signal communication lines to the control valves 122 and 124 are designated as 122C and 124C, respectively. The control signal lines to all of the valves of the first valve block 88 are collectively designated as 88C. The control signal lines to all of the valves of the baler primary valve block 90 are collectively designated as 90C.

Controller 130 includes or may be associated with a processor 138, a computer readable medium 140, a data base 142 and an input/output module or control panel 144 having a display 146. An input/output device 148, such as a keyboard, joystick or other user interface, is provided so that the human operator may input instructions to the controller. It is understood that the controller 130 described herein may be a single controller having all of the described functionality, or it may include multiple controllers wherein the described functionality is distributed among the multiple controllers.

Various operations, steps or algorithms as described in connection with the controller 130 can be embodied directly in hardware, in a computer program product 150 such as a software module executed by the processor 138, or in a combination of the two. The computer program product 150 can reside in RAM memory, flash memory, ROM memory, EPROM memory, EEPROM memory, registers, hard disk, a removable disk, or any other form of computer-readable medium 140 known in the art. An exemplary computer-readable medium 140 can be coupled to the processor 138 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The human operator of the baler 20 may input a command to the controller 130 via the input/output device 148 to place the baler 20 in a bale formation mode. As the baler 20 is pulled across the ground the crop material 102 is formed into the round bale 100. As the bale 100 grows within the bale chamber the controller 130 may monitor that bale growth with various sensors schematically noted as "S" in FIG. 5. Periodically during the bale growth, the controller may implement the processes described herein to boost the pressure in the tensioning cylinders 46, 48 via operation of the auxiliary pressure source 106. Similarly, the controller 130 may automatically control a wrapping and/or tying process at the end of the bale formation, and at least once during the wrapping and/or tying process the controller 130 may implement the processes described herein to boost the pressure in the tensioning cylinders 46, 48 via operation of the auxiliary pressure source 106.

Methods of Operation:

The baler 20 may be pulled by the tractor 10 as shown in FIG. 1. In this arrangement the quick connect couplings 80 and 82 from the baler hydraulic system 62 may be connected to the TSCV 74 and the TSCV 74 may be moved to an open position (left hand position schematically shown in FIG. 4) to connect the pressure line 76 to the hydraulic fluid supply line 68 and to connect the tank line 78 to the hydraulic fluid return line 70. The valves 88B and 88E may be opened and the valves 88A, 88C and 88D may be closed to communicate the baler hydraulic system 62 and particularly the rod ends of the tension cylinders 46, 48 with the hydraulic fluid supply line 68 which provides pressurized hydraulic fluid from the pump 64. The hydraulic fluid pressure provided from the pump 64 may for example be approximately 3000 psi.

Prior to a bale formation operation the valves of the first valve block 88 may be rearranged by closing valves 88B and 88E to isolate the tension cylinders 46, 48 from the tractor hydraulic system 12 thereby trapping an initial pressure within the rod ends of the tension cylinders 46, 48. This trapped initial pressure may be substantially equal to the pressure initially provided by the pump 64, e.g. about 3000 psi. The baler 20 may be operated in this fashion, as contrasted to leaving the baler hydraulic system 62 in constant communication with the tractor hydraulic system 12, for reasons of economy.

Optionally the low pressure relief valve 96 may be activated so that the trapped initial pressure may be substantially less than the pressure initially provided by the pump 64, e.g. about 1000 psi. This may be desirable because in some crops starting a bale 100 is challenging and having lower pressure helps start the bale. The pressure grows rapidly as bale 100 starts and belts 40 tighten and tension arm 44 begins pivoting upwards.

As the round bale 100 grows within the bale chamber 30 the growing bale pushes outward on the belts 40 and pushes the tensioning arm 44 upward thus pulling the rod end of the tensioning cylinders 46, 48 outward and increasing the pressure of the hydraulic fluid in the rod ends of the tensioning cylinders 46, 48. The pressure increase in the rod ends of the tensioning cylinders 46, 48 is normally limited by the operation of the high pressure relief valve 92, which may for example be set to a limit pressure of 4000 psi. The resistance to bale growth provided by the tensioning arm 44 and the tension belts 40 increases the density of the bale 100.

One problem that may occur during bale formation is that of some physical obstruction passing into the bale and creating a physical eccentricity that may push the tensioning arm 44 away from the periphery of the bale. With the tensioning cylinders 46, 48 isolated from the tractor hydraulic system 12 there may be no way to force the tensioning arm back against the bale.

Also it is desirable to be able to provide an increased hydraulic pressure to the rod ends of the tensioning cylinders 46, 48 above the limit pressure of the high pressure relief valve 92 so as to increase the density of the round bale during its formation.

The auxiliary pressure source 106 and the blocking valves 94 and 98 provide the ability to address both of these issues.

For example the controller 130 may be configured to coordinate operation of the blocking valves 94, 98 with the first control valve 122 to close the first blocking valve 94 and the second blocking valve 98 to temporarily block operation of the pressure relief valves 92 and 96. The controller may further be configured to open the first control valve 122 to temporarily communicate the cylinder side 112 of the piston 108 with a pressure from the primary pressure source 12 in the pressure line 76 and thereby temporarily provide the increased pressure from the rod side 114 of the piston 108 to the tension cylinders 46, 48.

After the operation of the auxiliary cylinder 106 to provide a pressure boost it may be necessary to retract the piston 108 prior to the next pressure boosting operation. This can be accomplished by closing control valve 122 and opening control valve 124 to place the cylinder side 112 of the piston 108 in communication with the tank line 78. The rod side 114 of piston 108 may also be placed in communication with the pressure line 76 by opening valve 88B.

The pressure increase provided by the auxiliary pressure source 106 may be a function of the relative areas of the cylinder side 112 and the piston side 114 of the piston 108. For example, the pressure of 3000 psi typically provided from the pump 64 of the tractor hydraulic system 12 may be boosted to about 5000 psi by the operation of the auxiliary pressure source 106.

The method just described may be summarized as a method of operating a round baler including steps of:
  (a) communicating the baler hydraulic system 62 with a primary pressure source 12 including a pump 64 and a fluid reservoir 66;
  (b) isolating the tension cylinder 46, 48 from the primary pressure source 12 and thereby trapping an initial pressure in the tension cylinder 46, 48;
  (c) as the round bale 100 forms in the bale chamber 30 during a bale forming operation, limiting pressure increase in the tension cylinder 46, 48 to a limit pressure with a pressure relief valve 92;
  (d) temporarily blocking operation of the pressure relief valve 92; and
  (e) during step (d), temporarily communicating the tension cylinder 46, 48 with an auxiliary pressure source 106 to increase hydraulic pressure in the tension cylinder 46, 48 to an increased pressure greater than the limit pressure.

In the above method steps (d) and (e) may be performed during the bale forming operation of step (c).

The method may further include after steps (d) and (e), isolating the tension cylinder 46, 48 from the auxiliary pressure source 106, placing the tension cylinder 46, 48 back in operable communication with the pressure relief valve 92, and continuing the bale forming operation.

In the above methods steps (d) and (e) may be periodically repeated during the bale forming operation of step (c) to insure that the tensioning arms and the tension belts 40 remain snugly engaged with the periphery of the growing bale 100. For example, if it takes approximately 60 seconds to form a bale, steps (d) and (e) may be repeated each 5 to 10 seconds. Preferably during each operation of the auxiliary pressure source 106 steps (d) and (e) may be maintained for at least one revolution of the bale within the bale chamber.

Step (e) may result in an increase in a tension of the tension belts 40 and thereby in an increased compaction density of the round bale 100.

Steps (d) and (e) may be controlled by the automatic controller 130. Step (b) may be performed by closing the valves 88B and 88E valve block 88 of the baler hydraulic system 62 under control of the automatic controller 130. The repetition and the duration of steps (d) and (e) may be controlled by the automatic controller 130.

In one embodiment the initial pressure provided from the primary pressure source 12 may be in a range of from 2500 to 3500 psi, and may be about 3000 psi. The limit pressure determined by the high pressure relief valve 92 may be at least 500 psi greater than the initial pressure, and more preferably 800 to 1000 psi greater than the initial pressure. The increased pressure provided by the auxiliary pressure source 106 to the tension cylinder 46, 48 may be at least 500 psi greater than the limit pressure, and more preferably at least 1000 psi greater than the limit pressure.

After the bale formation operation, steps (d) and (e) may also be repeated during a bale wrapping or a bale tying operation using the bale wrapping and/or tying system 50. When steps (d) and (e) are performed during the bale wrapping and/or tying operation they preferably are maintained for at least one full revolution of the bale 100 within the bale chamber 30 to insure that a tightly compressed bale is maintained during the bale wrapping and/or tying operation.

Also of course steps (d) and (e) could be performed during the bale wrapping and/or tying operation and omitted during the bale formation operation.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of operating a round baler, the round baler including at least one tension belt, at least one tension cylinder for maintaining tension on the tension belt as a round bale is formed in a bale chamber, and a baler hydraulic system communicated with the tension cylinder, the method comprising:
    (a) communicating the baler hydraulic system with a primary pressure source including a pump and a fluid reservoir;
    (b) isolating the tension cylinder from the primary pressure source and thereby trapping an initial pressure in the tension cylinder;
    (c) as the round bale forms in the bale chamber during a bale forming operation, limiting pressure increase in the tension cylinder to a limit pressure with a pressure relief valve;
    (d) temporarily blocking operation of the pressure relief valve; and
    (e) during step (d), temporarily communicating the tension cylinder with an auxiliary pressure source to increase hydraulic pressure in the tension cylinder to an increased pressure greater than the limit pressure;
    wherein steps (d) and (e) are performed during the bale forming operation of step (c); and
    wherein the method further comprises after steps (d) and (e);
    isolating the tension cylinder from the auxiliary pressure source;
    placing the tension cylinder back in operable communication with the pressure relief valve; and
    continuing the bale forming operation.

2. The method of claim 1, further comprising:
    periodically repeating steps (d) and (e) during the bale forming operation of step (c).

3. The method of claim 1, wherein:
    step (e) results in a lowering movement in a tension arm of the round baler thereby imparting a local squeezing on the round bale.

4. The method of claim 1, wherein:
    step (e) results in an increase in a tension in the tension belt and thereby in an increased compaction density of the bale.

5. The method of claim 1, wherein:
    the round baler is pulled by a tractor and the primary pressure source is a part of a tractor hydraulic system; and
    step (a) includes connecting the baler hydraulic system to a tractor selective control valve of the tractor hydraulic system and opening the tractor selective control valve.

6. The method of claim 1, wherein:
    step (b) includes closing an automatic gate valve block of the baler hydraulic system under control of an automatic controller of the baler.

7. The method of claim 1, wherein:
    steps (d) and (e) are controlled by an automatic controller of the baler.

8. A method of operating a round baler, the round baler including at least one tension belt, at least one tension cylinder for maintaining tension on the tension belt as a round bale is formed in a bale chamber, and a baler hydraulic system communicated with the tension cylinder, the method comprising:
    (a) communicating the baler hydraulic system with a primary pressure source including a pump and a fluid reservoir;
    (b) isolating the tension cylinder from the primary pressure source and thereby trapping an initial pressure in the tension cylinder;
    (c) as the round bale forms in the bale chamber during a bale forming operation, limiting pressure increase in the tension cylinder to a limit pressure with a pressure relief valve;
    (d) temporarily blocking operation of the pressure relief valve; and
    (e) during step (d), temporarily communicating the tension cylinder with an auxiliary pressure source to increase hydraulic pressure in the tension cylinder to an increased pressure greater than the limit pressure;
    wherein steps (d) and (e) are performed during the bale forming operation of step (c); and
    wherein the method further includes:
    after the bale forming operation, wrapping the bale in a bale wrapping operation while the bale is in the bale chamber; and
    repeating steps (d) and (e) during the bale wrapping operation.

9. A method of operating a round baler, the round baler including at least one tension belt, at least one tension cylinder for maintaining tension on the tension belt as a round bale is formed in a bale chamber, and a baler hydraulic system communicated with the tension cylinder, the method comprising:
    (a) communicating the baler hydraulic system with a primary pressure source including a pump and a fluid reservoir;

(b) isolating the tension cylinder from the primary pressure source and thereby trapping an initial pressure in the tension cylinder;

(c) as the round bale forms in the bale chamber during a bale forming operation, limiting pressure increase in the tension cylinder to a limit pressure with a pressure relief valve;

(d) temporarily blocking operation of the pressure relief valve; and (e) during step (d), temporarily communicating the tension cylinder with an auxiliary pressure source to increase hydraulic pressure in the tension cylinder to an increased pressure greater than the limit pressure;

wherein steps (d) and (e) are performed after the bale forming operation of step (c) and during a bale wrapping or bale tying operation.

10. The method of claim 9, wherein the method further comprises after steps (d) and (e):

isolating the tension cylinder from the auxiliary pressure source;

placing the tension cylinder back in operable communication with the pressure relief valve; and continuing the bale wrapping or bale tying operation.

11. The method of claim 9, wherein:

steps (d) and (e) are maintained for at least one full revolution of the bale within the bale chamber during the bale wrapping or bale typing operation.

12. A method of operating a round baler, the round baler including at least one tension belt, at least one tension cylinder for maintaining tension on the tension belt as a round bale is formed in a bale chamber, and a baler hydraulic system communicated with the tension cylinder, the method comprising:

(a) communicating the baler hydraulic system with a primary pressure source including a pump and a fluid reservoir;

(b) isolating the tension cylinder from the primary pressure source and thereby trapping an initial pressure in the tension cylinder;

(c) as the round bale forms in the bale chamber during a bale forming operation, limiting pressure increase in the tension cylinder to a limit pressure with a pressure relief valve;

(d) temporarily blocking operation of the pressure relief valve; and (e) during step (d), temporarily communicating the tension cylinder with an auxiliary pressure source to increase hydraulic pressure in the tension cylinder to an increased pressure greater than the limit pressure;

wherein in step (e) the auxiliary pressure source includes an auxiliary hydraulic cylinder assembly including a piston movable in a cylinder, the piston having a cylinder side and a rod side, the cylinder side having a larger area than the rod side, and step (e) includes applying pressure from the primary pressure source to the cylinder side of the piston and communicating the increased pressure greater than the limit pressure from the rod side of the piston to the tensioning cylinder.

13. A round baler for forming a round bale of hay, comprising:

a bale chamber;

a tension belt;

a tension cylinder configured to place tension on the tension belt as the round bale is formed in the bale chamber;

a baler hydraulic system including a pressure line and a tank line, the pressure line being configured for connection to a hydraulic fluid supply line of a primary pressure source, the tank line being configured for connection to a hydraulic fluid return line of the primary pressure source;

a valve block disposed in the baler hydraulic system and configured to control communication between the tension cylinder and the primary pressure source;

a first pressure relief valve disposed in the baler hydraulic system and configured to limit pressure in the tension cylinder to a first limit pressure as the round bale is formed in the bale chamber; and an auxiliary pressure source configured to temporarily increase hydraulic pressure in the tension cylinder to an increased pressure greater than the first limit pressure;

wherein the auxiliary pressure source includes an auxiliary hydraulic cylinder assembly including a piston movable in a cylinder, the piston having a cylinder side and a rod side, the cylinder side having a larger area than the rod side.

14. The round baler of claim 13, further comprising:

a pressure tie-in line communicating the pressure line with the cylinder side of the piston;

a tank tie-in line communicating the tank line with the cylinder side of the piston; and an auxiliary pressure line communicating the rod side of the piston with the tension cylinder.

15. The round baler of claim 14, further comprising:

a first control valve for controlling flow of hydraulic fluid through the pressure tie-in line; and a second control valve for controlling flow of hydraulic fluid through the tank tie-in line.

16. The round baler of claim 15, further comprising:

a first blocking valve configured to temporarily block operation of the first pressure relief valve.

17. The round baler of claim 16, further comprising:

a controller configured to coordinate operation of the first blocking valve and the first control valve to:

close the first blocking valve to temporarily block operation of the first pressure relief valve; and open the first control valve to temporarily communicate the cylinder side of the piston with a pressure from the primary pressure source in the pressure line and thereby temporarily provide the increased pressure from the rod side of the piston to the tension cylinder.

* * * * *

UNITED STATES PATENT AND TRADEMARK OFFICE
CERTIFICATE OF CORRECTION

| | |
|---|---|
| PATENT NO. | : 12,336,457 B2 |
| APPLICATION NO. | : 17/847322 |
| DATED | : June 24, 2025 |
| INVENTOR(S) | : Austin J. Jones |

Page 1 of 1

It is certified that error appears in the above-identified patent and that said Letters Patent is hereby corrected as shown below:

In the Specification

Column 2, Line 27 - Add -- 10. -- after the word "tractor"

Signed and Sealed this
Sixteenth Day of September, 2025

Coke Morgan Stewart
*Acting Director of the United States Patent and Trademark Office*